(12) United States Patent
Steinhilb

(10) Patent No.: US 9,598,114 B2
(45) Date of Patent: Mar. 21, 2017

(54) VEHICLE FENDER ENERGY ABSORBING APPARATUS

(71) Applicant: Toyota Motor Engineering & Manufacturing North America, Inc., Erlanger, KY (US)

(72) Inventor: Aaron Richard Steinhilb, Westland, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/448,596

(22) Filed: Jul. 31, 2014

(65) Prior Publication Data

US 2016/0031487 A1    Feb. 4, 2016

(51) Int. Cl.
*B62D 25/16* (2006.01)
*B60R 21/34* (2011.01)

(52) U.S. Cl.
CPC ............ *B62D 25/163* (2013.01); *B60R 21/34* (2013.01); *B60R 2021/343* (2013.01)

(58) Field of Classification Search
CPC .. B62D 25/163; B60R 21/34; B60R 2021/343
USPC .................................................... 296/187.04
See application file for complete search history.

(56) References Cited

U.S. PATENT DOCUMENTS

| | | | |
|---|---|---|---|
| 4,061,384 A * | 12/1977 | Montgomery et al. | ....... 293/109 |
| 4,190,276 A | 2/1980 | Hirano et al. | |
| 6,554,341 B2 | 4/2003 | Lee | |
| 7,128,339 B2 | 10/2006 | Mani | |
| 7,204,545 B2 * | 4/2007 | Roux et al. | ............. 296/187.09 |
| 7,287,809 B2 | 10/2007 | Andre | |
| 7,374,231 B2 | 5/2008 | Aase et al. | |
| 7,677,616 B2 * | 3/2010 | Taniguchi | ............... B60R 19/18 293/102 |
| 7,857,365 B2 | 12/2010 | Gill | |
| 8,056,961 B2 | 11/2011 | Aase et al. | |
| 8,182,027 B2 * | 5/2012 | Steinhilb | ............. B62D 25/163 296/187.03 |
| 8,403,391 B2 | 3/2013 | Steinhilb et al. | |
| 2004/0251716 A1 | 12/2004 | Choi et al. | |
| 2012/0009404 A1 | 1/2012 | Heb et al. | |

FOREIGN PATENT DOCUMENTS

JP    2001287669 A    10/2001

* cited by examiner

*Primary Examiner* — Glenn Dayoan
*Assistant Examiner* — Melissa A Black
(74) *Attorney, Agent, or Firm* — Christopher G. Darrow; Darrow Mustafa PC

(57) ABSTRACT

An energy absorption member coupled between a vehicle front fender and a vehicle side structural member providing peak impact force resistance and energy absorption during an impact force imposed on the front fender. The energy absorption member extends continuously along the length of the front fender opposed from the side structural member to provide constant load along the entire length of the front fender. The energy absorption member may be a foamed block, a vertical, or horizontal oriented honeycomb structure or spaced hollow crush lobes.

7 Claims, 6 Drawing Sheets

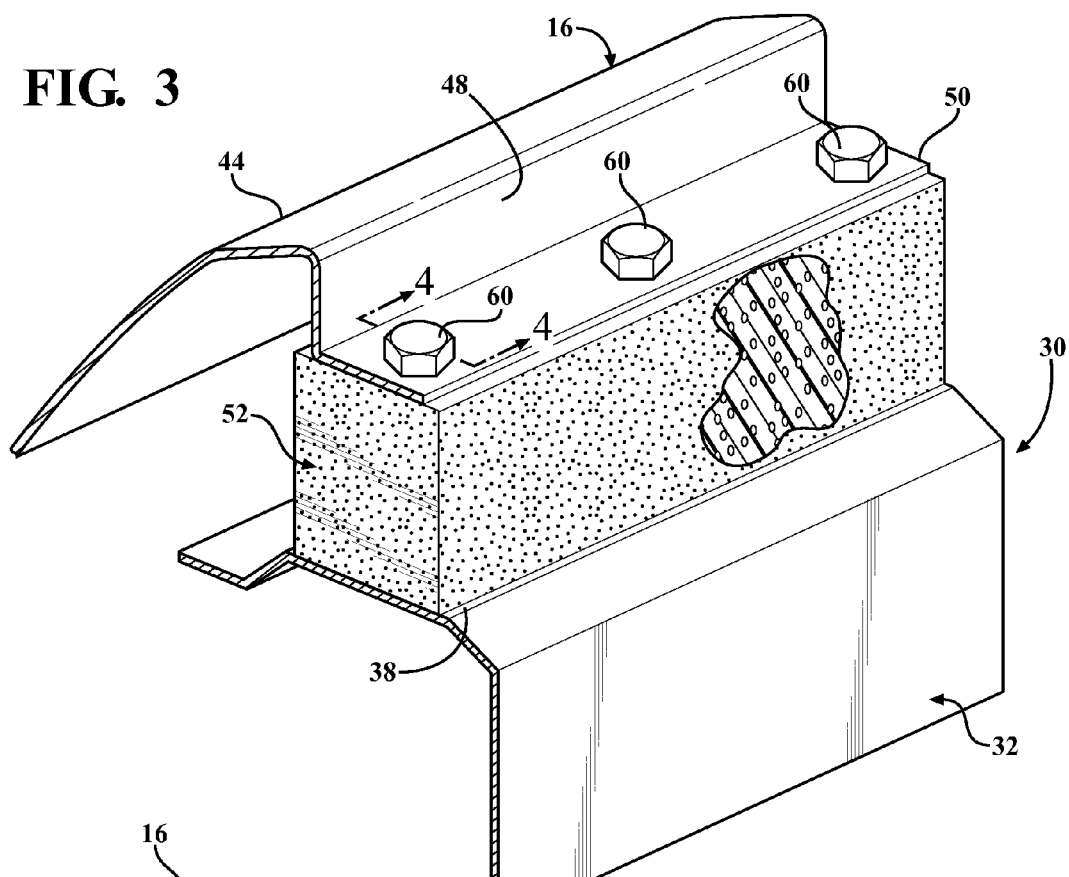

VEHICLE FENDER ENERGY ABSORBING APPARATUS

BACKGROUND

The present disclosure relates, in general, to vehicle body structures and, particularly, to energy absorbing vehicle panel mounting structures.

Automobile bodies are typically formed of a number of metal panels that are mounted on underlying rigid frame members. One such panel is a front fender structure. The fender is disposed on an apron structural member attached to or otherwise forming part of the rigid vehicle frame. Fender attachment brackets which undergo buckling deformation on impact, as shown in U.S. Pat. No. 8,182,027 B2, have been proposed to attach the fender to the apron structural member and to absorb impact energy.

Such energy absorption members are employed to protect pedestrians and, in particular, pedestrian's heads, when a vehicle contacts a pedestrian.

Despite the use of energy absorption brackets with vehicle fenders, it is still desirable to provide an energy vehicle fender construction which can be easily and inexpensively implemented with minimal clearance space, while still meeting required peak impact force and minimal deformation stroke distance.

SUMMARY

A vehicle includes a front fender having an outer portion and a connecting portion, and a side structural member. An energy absorption member attaches the front fender to the side structural member, the energy absorption member extending substantially over an entire length of the front fender overlaying the side structural member.

The energy absorption member can be formed of a foamed thermoplastic. The energy absorption member can be formed of a honeycomb structure having unitarily interconnected cells. The honeycomb structure of the energy absorption member has unitarily joined unit cell walls surrounding a hollow interior, with the unit cell walls extending in one of a vertical direction and a horizontal direction between the front fender and the side structural member.

The energy absorption member can be formed of an elongated base and a plurality of hollow lobes unitarily joined to the base and extending in one direction from the base. The base is fixedly coupled to the side structural member; and the lobes are fixedly coupled to the front fender.

BRIEF DESCRIPTION OF THE DRAWING

The various features, advantages and other uses of the present vehicle fender energy absorbing apparatus will become more apparent by referring to the following detailed description and drawing in which:

FIG. 3 is a perspective view of the vehicle fender energy absorbing apparatus shown in FIG. 2;

FIG. 4 is a cross-sectional view, generally taken along line 4-4 in FIG. 3 and showing the attachment of the vehicle fender energy absorbing apparatus to rigid vehicle structure;

DETAILED DESCRIPTION

The present vehicle fender energy absorbing apparatus provides a peak impact force resistance and minimal deformation stroke for increased energy absorption capabilities when used between the vehicle fender and underlying rigid vehicle frame structure. The energy absorption apparatus can be provided in several different configurations to meet maximum force and deformation stroke requirements.

In multiple aspects, the energy absorption apparatus includes an energy absorption member, formed of foam, hollow lobes, or a honey comb structure fixedly interposed between the vehicle front fender and an underlying fender support, such as an apron side structural member forming part of or fixed to the vehicle frame. The energy absorption member can extend for substantially the entire longitudinal length of the front fender for increased energy absorption protection.

Figure 1:
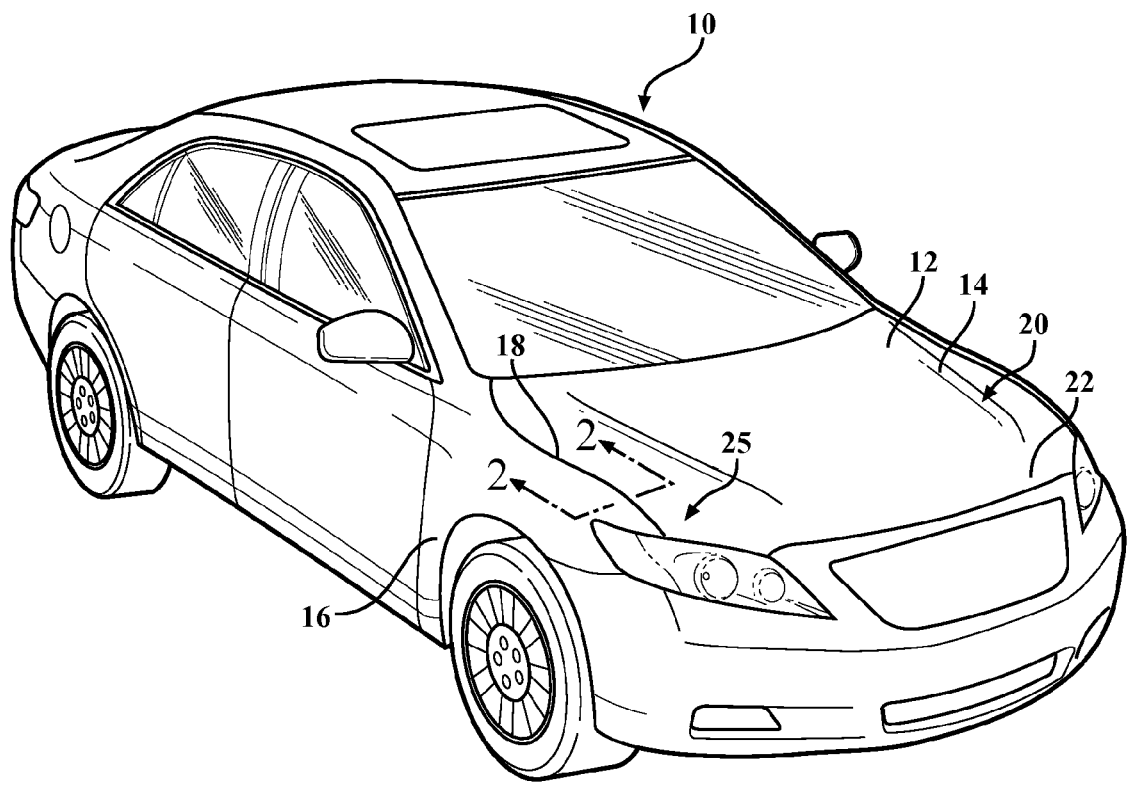
FIG. 1 is a perspective view of a vehicle incorporating a vehicle fender energy absorbing apparatus.
Figure 2:
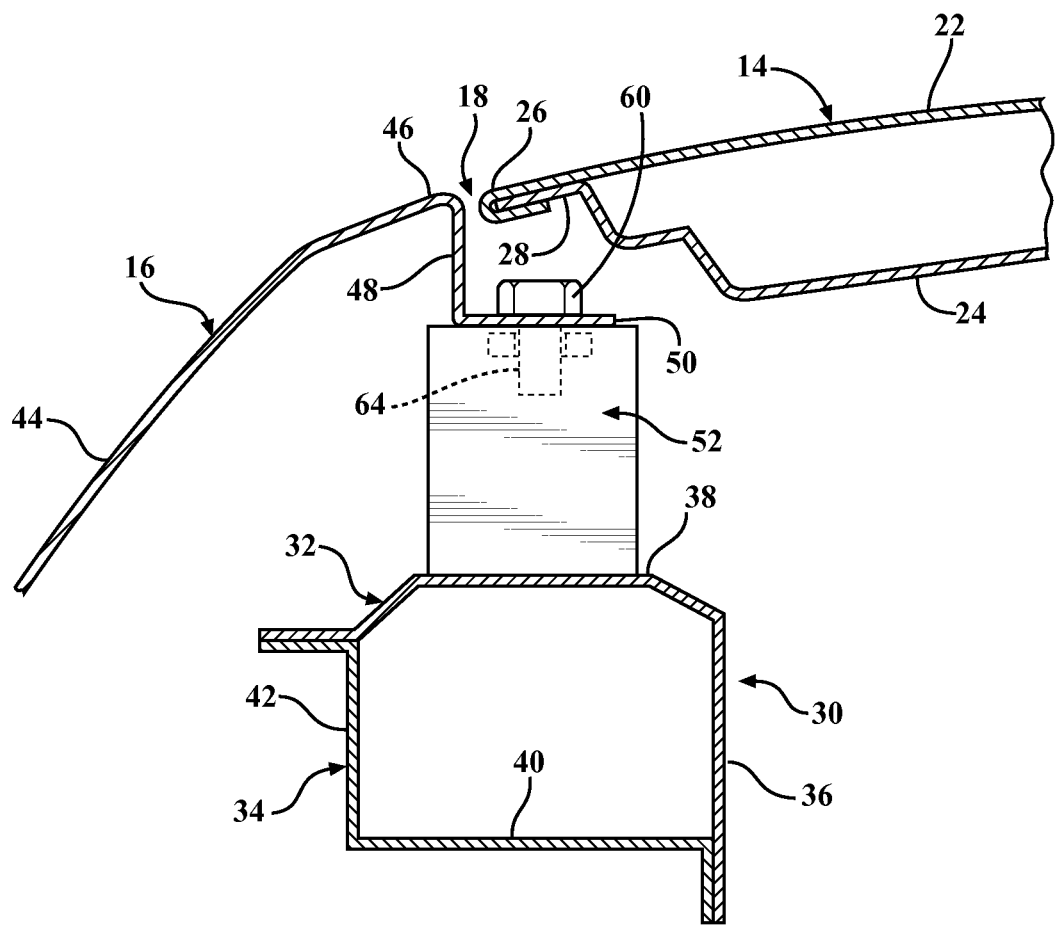
FIG. 2 is a cross-sectional view, generally taken along line 2-2 in FIG. 1, and showing an energy absorption apparatus used in connection with a vehicle fender.

FIG. 1 generally depicts one aspect of a motor vehicle 10. The vehicle 10 includes a vehicle body 12 with a hood 14, a front fender 16 and a boundary line 18 running along the length of the vehicle 10 between the hood 14 and the front fender 16. The hood 14 (which may be formed of a metal material) is generally disposed above an engine compartment 20 so as to be able to open the hood 14 to gain access to the engine compartment 20. The hood 14 may be formed of multiple panels, such as an outer hood panel 22 and an inner hood panel 24 (FIG. 2). The front fender 16 which may be formed of a metal or plastic material, is located to a side of the outer hood panel 22. As will be described in greater detail below, the front fender 16 is attached to a side or apron structural member or assembly generally designated element 25 that is positional along the length of the vehicle 10.

Referring to FIG. 2, the inner hood panel 24 is located on a lower side of the outer hood panel 22. The inner hood panel 24 may be attached to the outer hood panel 22 such that an outer edge portion 26 of the outer hood panel 22 is fixed by hemming to an outer flange 28 of the inner hood panel 24 that projects outward in the vehicle widthwise direction. Any other suitable connection structure may be used to connect the inner and outer hood panels 24 and 22.

The side or apron structural member 30 is located below the boundary line 18 between the hood 14 and the front fender 16. The apron structural member 30 extends generally in the lengthwise direction of the vehicle 10 with the boundary line 18. The apron structural member 30 can include an upper apron member 32 and a lower apron member 4. The upper apron member 32 includes a vertical portion 36 that is connected to a horizontal portion 38 forming a somewhat L-shaped section as viewed in the lengthwise direction of the vehicle 10. The lower apron member 34 includes a horizontal portion 40 connected to a vertical portion 42 forming a somewhat L-shaped section as viewed in the lengthwise direction of the vehicle 10. The upper and lower apron members 32 and 34 may be connected in any suitable manner such as by fasteners, welding, etc. In some aspects the upper apron member 32 and the lower apron member 34 cooperate to form a closed space or area that extends in the lengthwise direction of the vehicle 10. Other configurations are possible for the apron structural member 30, such as U-shaped upper member that is connected to an L-shaped lower member.

Referring to FIGS. 2 and 3, the front fender 16 includes an outer wall 44 that extends vertically downward from a top end portion 46 of the outer wall 44 toward a front wheel of the vehicle 10. An inner wall 48 extends downwardly from the top end portion 46 of the boundary line 18 to a horizontal connecting wall 50 disposed at least partially below the hood 14.

An energy absorbing apparatus or member 52 is fit in between the horizontal connecting wall 50 of the front fender 16 and the horizontal portion or surface 38 of the apron structural member 30 (hereafter "apron 30"). The energy absorption apparatus 52, in the aspect shown in FIGS. 2-4, is in the formed of a foam block or a series of end-to-end abutting shorter length blocks which extend for substantially the entire length of the front fender 16 and the spaced horizontal portion 38 of the apron 30.

In one aspect, the energy absorption member 52 is formed of a foamed thermoplastic resin, such as polypropylene or polyurethane. The density of the foam material 52, as well as the possible existence of cut out portions at predetermined locations along the length of the energy absorption member 52 provides tuning so that the energy absorption member 52 has a predetermined maximum peak force resistance before deforming at a predetermined deformation stroke distance to absorb energy from impacts imposed on the front fender 16.

The energy absorption member 52 may be in the form of a constant cross-section block or a block may have varying height as well as lateral width or cross-section depending upon the outer shape of the front fender 16 along the length of the apron 30.

The energy absorption member 52 may be fixedly attached to the horizontal connecting wall 50 of the front fender 16 and to the horizontal surface 38 of the apron 30 by suitable means, including adhesive, fasteners, etc. By way of example only, FIGS. 2, 3, and 4 depict the use of bolts 60 which have a threaded shaft portion 62 inserted into an aperture 64 in the horizontal connecting wall 50 of the front fender 16 through a nut 64 mounted or attached to the energy absorption member 52. The nut 64 may be foamed in place in the energy absorption member 52 or otherwise fixedly attached to the energy absorption member 52.

In the case of an open apron structure allowing access to the bottom surface of the horizontal connecting wall 38 of the apron 30, a similar nut 64 and bolt 60 may be employed to attach the bottom surface of the energy absorption member 52 to the horizontal connecting portion 38 of the apron 32.

For a closed apron 30 structure, as shown in FIG. 2, the energy absorption member 52 can be adhesively joined to the horizontal connecting portion 38.

Impact forces imposed on the front fender 16 by the head and/or the upper torso of a pedestrian will be absorbed by the energy absorption member 52 up to a peak force. After the peak force is reached the energy absorption member 52 deforms at a predetermined, designed rate and stroke deformation distance as determined by the characteristics of the material forming the energy absorption member 52, and the structure of the energy absorption member 52, to absorb impact energy and minimize injury to the pedestrian.

Figure 5:
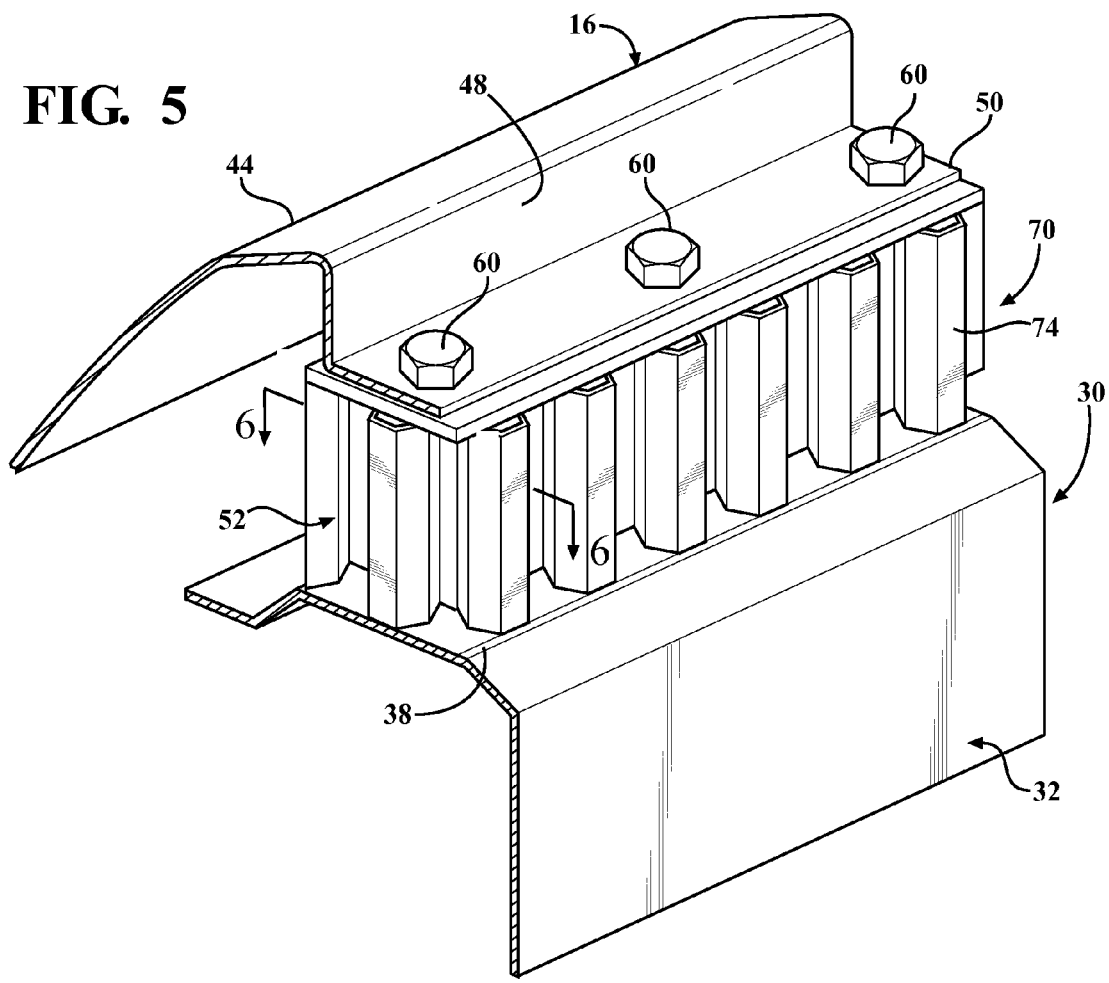
FIG. 5 is a perspective view of another aspect of a vehicle fender energy absorbing apparatus used in a vehicle shown in FIG. 1.
Figure 6:
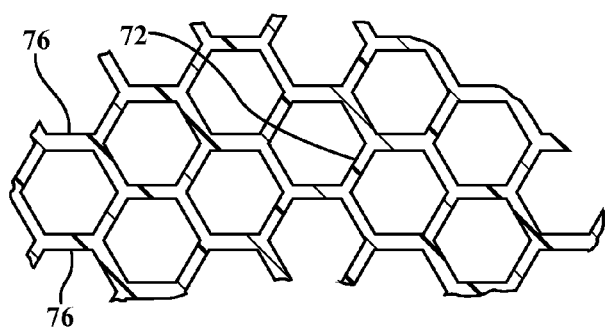
FIG. 6 is a cross-sectional view generally taken along line 6-6 in FIG. 5.

FIGS. 5 and 6 depict another aspect of an energy absorption apparatus or member 70 which, like the energy absorption member 52, is fixedly secured to and between the horizontal connecting wall 50 of the front fender 16 and the horizontal portion 38 of the apron 30. Bolts 60 and nuts 64, as shown in FIG. 4, may also be employed to fixedly couple the horizontal connecting wall 50 of the front fender 16 to one surface of the energy absorption member 70. Adhesive and other connecting means may also be employed.

In this aspect, the energy apparatus or energy absorption member 70 is in the form of a molded or extruded honeycomb structure formed of interconnected unit cells 72 which are unitarily joined into a single mass.

Each unit cell 72 may take any number of shapes with respect to design considerations, such as to the peak force before deformation starts, as well as the amount of energy absorption during deformation and the deformation stroke distance.

The unit cells 72 may be formed of a metal or plastic. In the aspect of the energy absorption member 70 shown in FIGS. 5 and 6, the unit cells 72 have a height 74 when outer walls 76 of the unit cells 72 of the honeycomb structure are oriented vertically, as shown in FIG. 5, to extend between the horizontal connecting wall 50 of the front fender 16 and the horizontal portion 38 of the apron 32.

The material density, shape and thickness of the walls 76 of the unit cells 72 may be selected to meet to the design parameters of maximum peak force and energy absorption during deformation stroke distance. Thus, the unit cell 72 can take other shapes, in addition to the hexagonal shown in FIGS. 5 and 6, such as, for example, rectangular, polygonal, circular, oval, etc., shapes. The unit cells 72 may also be have different shapes or thickness throughout the entire honeycomb structure.

Figure 7:
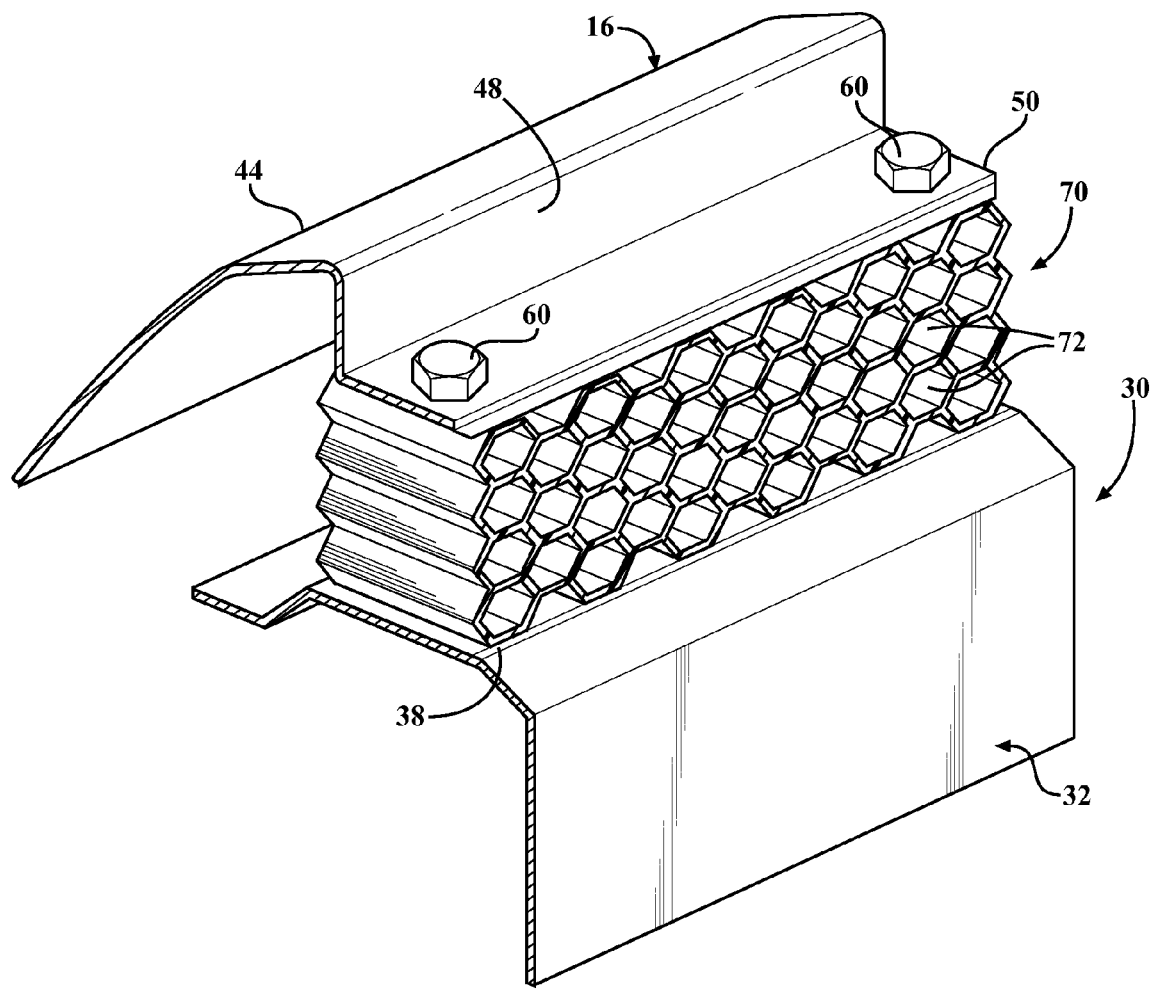
FIG. 7 is a cross-sectional view showing a modification of the vehicle fender energy absorbing apparatus depicted in FIGS. 5 and 6.

In FIG. 7, a modification to the energy absorption apparatus 70 is shown. In this aspect, the energy absorption apparatus 70 is oriented 90° from the orientation shown in FIG. 5 so that the walls 76 of the unit cells 72 forming the honeycomb structure of the energy absorption apparatus 70 extend horizontally between the horizontal connecting wall 50 of the front fender 16 and the horizontal portion 38 of the apron 30. Suitable fasteners, such as nuts and bolts, adhesive, or combinations thereof, may be employed to fixedly mount and connect the energy absorption apparatus 70 to the horizontal connecting wall 50 of the front fender 16 and the horizontal portion 38 of the apron 30.

Figure 8:
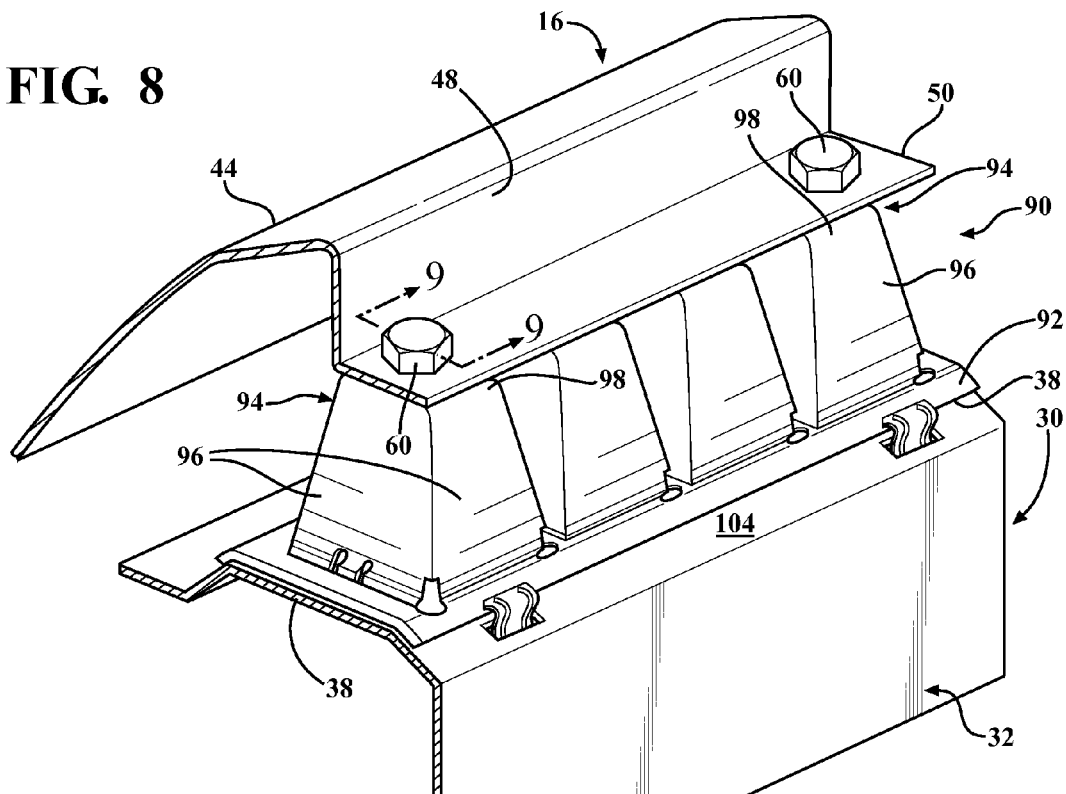
FIG. 8 is a perspective view of another aspect of a vehicle fender energy absorbing apparatus used in the vehicle shown in FIG. 1.
Figure 9:
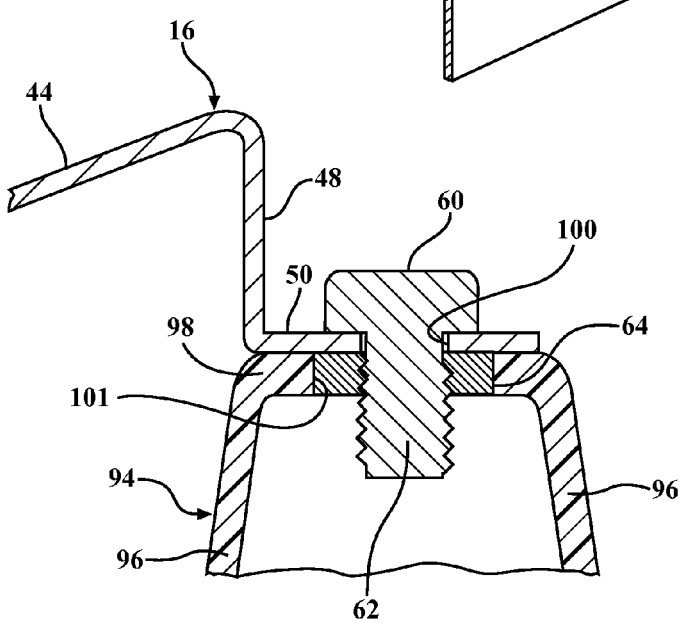
FIG. 9 is a cross-sectional view generally taken along line 9-9 in FIG. 8.

FIGS. 8 and 9 depict another aspect of an energy absorption apparatus 90 interposed and coupled to the horizontal connecting wall 50 of the front fender 16 and the horizontal portion 38 of the apron 30. In this aspect, the energy absorption apparatus 90 is in the form of a polymeric member formed of an elongated base 92 which fixedly engages the horizontal portion 38 of the apron 30. A plurality of side-by-side disposed lobes, all denoted by reference number 94, are unitarily joined to the base 92 and project outwardly in one direction from the base 92. The lobes 94 which may have any predetermined geometric shape, are shown by example in FIGS. 8 and 9 as having four side walls, also referred to as shear walls, which taper inward from a large dimension end at the base 92 to a smaller width end at a front wall 98, which faces the horizontal connecting wall 50 of the front fender 16. The thickness, shape, the provision of apertures in selected portions of the shear walls 96 and a front wall 98 provide predetermined peak force resistance prior to buckling or deformation of the shear walls 98. During such buckling, the shear walls 96 absorb impact energy.

The base 92 may be coupled to the horizontal portion 38 of the apron 30 by bolts (not shown) or by tabs aligned in slots. Bolts 60 may also be provided that extend through apertures 100 in the horizontal connecting wall 50 and into corresponding apertures 101 in the front wall 98 of the lobe 94 and through the horizontal portion 38 of the apron 32 and engage a threaded nut (not shown). The base 92 may also be adhesively joined to the horizontal portion 38 of the apron 30.

As shown in FIG. 9, a nut 64 may be adhesively joined to the front wall 98 of the lobes 94 or insert molded in the front wall 98. The nut 64 receives the thread shaft 62 of bolt 60 which extends through an aperture in the horizontal connecting wall 50 of the front fender 16 to fixedly couple the lobes 94 to the front fender 16. The nuts 64 may be provided in all of the lobes 94 or in alternating or only certain ones of the lobes 94.

The unique energy absorption apparatus disclosed herein provides a constant load along substantially the entire length of the front fender as compared to discrete load points of the spaced fender attachments used previously.

What is claimed is:

1. A front fender structure for a vehicle, comprising:
a front fender having an outer portion and a connecting portion; and
an energy absorption member attaching the connecting portion of the front fender to a side structural member in the vehicle, the energy absorption member formed of a foamed thermoplastic resin, shaped as a block and extending substantially over an entire length of the front fender overlaying the side structural member, the foamed thermoplastic resin having a density such that the energy absorption member has a predetermined maximum peak force resistance before deforming at a predetermined deformation stroke distance to absorb energy from impacts imposed on the front fender, further wherein the energy absorption member comprises a plurality of foamed in place nuts to receive fasteners coupling the front fender to the energy absorption member.

2. The front fender structure of claim 1, wherein:
the energy absorption member has a substantially constant cross-section, and is configured to provide a substantially constant load along an entire length of the front fender.

3. The front fender structure of claim 1, wherein:
the energy absorption member is formed of a unitary foam block with cut out portions at predetermined locations along a length of the energy absorption member.

4. The front fender structure of claim 1, wherein:
the energy absorption member comprises a series of end-to-end abutting foam blocks.

5. A front fender structure for a vehicle comprising:
a front fender having an outer portion and a connecting portion; and
an energy absorption member attaching the connecting portion of the front fender to a side structural member in the vehicle, the energy absorption member being a polymeric member formed defining an elongated base and a plurality of spaced apart, hollow crush lobes unitarily joined to the base and projecting outwardly from the base, the energy absorption member extending substantially over an entire length of the front fender overlaying the side structural member, each crush lobe including four tapered shear walls extending from the base and ending at a front wall, wherein each front wall comprises an insert molded nut received in an aperture defined in the front wall, the nut being configured to receive a fastener for fixedly coupling the front walls of respective lobes to the front fender, further wherein the base is fixedly coupled to the side structural member.

6. The front fender structure of claim 5, wherein:
the energy absorption member is configured to provide a constant load along an entire length of the front fender.

7. The front fender structure of claim 5, wherein:
the energy absorption member has a predetermined maximum peak force resistance before deforming at a predetermined deformation stroke distance to absorb energy from impacts imposed on the fender.

* * * * *